E. J. WEAVER.
Flour Bolt Feeder.

No. 108,417. Patented Oct. 18, 1870.

Witnesses:

Inventor:
E. J. Weaver
per Munn & Co.
Attorneys

United States Patent Office.

EDWARD J. WEAVER, OF STERLING, ILLINOIS.

Letters Patent No. 108,417, dated October 18, 1870.

IMPROVEMENT IN FLOUR-BOLT FEEDERS.

The Schedule referred to in these Letters Patent and making part of the same

*To all whom it may concern:*

Be it known that I, EDWARD J. WEAVER, of Sterling, in the county of Whiteside and State of Illinois, have invented a new and and useful Improvement in Bolt-Feeder; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
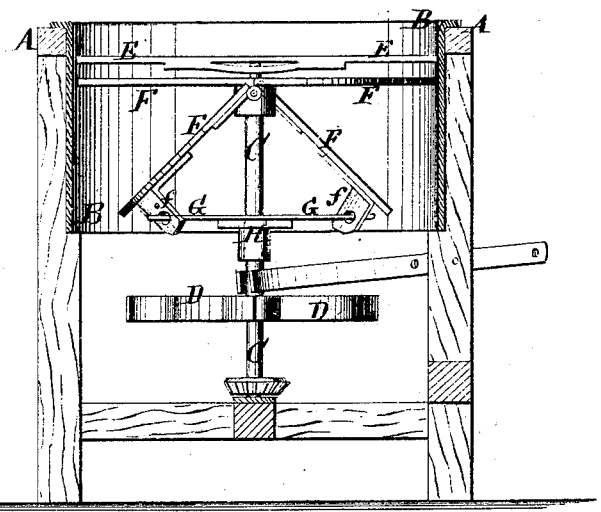
Figure 1 is a vertical section of my improved bolt-feeder.

My invention relates to bolt-feeders, and my object is to cut and break up dough balls or other substances, and thereby prevent choking in the machine.

This I accomplish by means of the relative arrangement of a bridge-tree, the hinged wings F F, and two stationary horizontal wings.

A represents the hopper-boy, from which the flour or meal is raked into the tube B in the ordinary manner.

C is a shaft, the lower end of which is geared to the bolt-shaft, or driven by any other convenient means.

To the shaft C is attached a three-armed spider, D, by which the flour or meal is scraped from the bottom of the feeder (not shown in the drawing) into the spout, by which it is connected to the bolt.

The upper end of the shaft C revolves in a bearing in the bridge-tree E, attached to the tube B, near its upper end.

Figure 2:
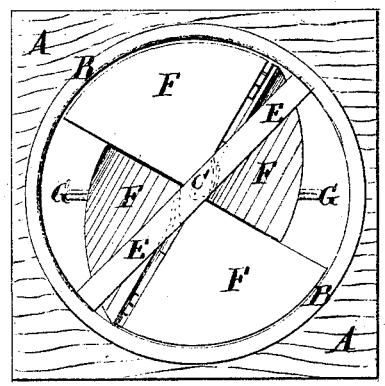
Figure 2 is a top view of the same.
Figure 3:
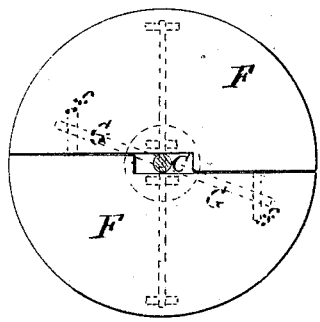
Figure 3 represents a modification of the same.

F is a disk, fitted into the upper part of the tube B, and which may be made in four or two parts, as may be desired. When made in four parts, two of said parts are stationary, and the other two parts are hinged to their edges, as shown in fig. 2. When made in two parts, both of said parts are movable, and are pivoted to a cross-rod, as shown in fig. 3.

By this construction, by setting the movable parts of the disk F at a greater or lesser angle, the discharge openings of the feeder may be adjusted to allow the meal to pass through faster or slower, as may be required, and will cause it to pass through uniformly so long as the disk is kept adjusted in the same way.

To the under side of the movable parts of the disk F are attached eyes $f$, through which pass and in which work the ends of the cross-bar G, the middle part of which is attached to a sleeve, H, through which passes the shaft C, and which moves up and down upon the said shaft to adjust the angle at which the movable parts of the disk F are set, and thus regulate the rapidity of the feed.

The position of the sleeve H may be adjusted by a lever pivoted to some suitable and convenient support, or by some other suitable means.

Having thus described my invention,—

I claim as new and desire to secure by Letters Patent—

The bridge-tree E, the hinged wings F F, and horizontal stationary wings F F, combined and arranged near the top of tube B, as and for the purpose described.

EDWARD J. WEAVER.

Witnesses:
E. G. ALLEN,
J. M. HERRON.